March 14, 1933.   C. C. CORKRAN   1,901,085

FLUID INJECTING DEVICE

Filed Aug. 7, 1928

Inventor

Ceylon C. Corkran

By Lyon & Lyon Attorneys

Patented Mar. 14, 1933

1,901,085

UNITED STATES PATENT OFFICE

CEYLON C. CORKRAN, OF SAN FRANCISCO, CALIFORNIA

FLUID INJECTING DEVICE

Application filed August 7, 1928. Serial No. 298,097.

This invention relates to fluid injecting devices, and is particularly related to a time actuated device adapted to inject fluid in timed relation with the movement of another element, as for example, a timed oil check for injecting lubricant on a rapidly moving piston to maintain the same lubricated, or to inject a fluid or fluid fuel under pressure in timed relation into a receiving fuel-firing chamber.

The lubrication of fast moving parts, for example, a piston moving with high lineal speed requires the formation on the piston itself of an adequate film of correct lubricating oil. When operating under conditions of high temperature, as in large gas engines, this film is constantly burned off from the cylinder walls. The film formed between the periphery of the piston or its sealing rings, which when formed may be adequate to provide the proper seal of the piston within the cylinder, and the required lubricating properties, is alternately ruptured by the reversal from high pressures to pressures less than atmospheric.

This film of lubricant therefore must be constantly renewed to hold the correct seal and protect the piston and its rings from premature friction wear.

An object of this invention is to provide a device adapted to inject under pressure a predetermined quantity of lubricant at a predetermined time on to a piston traveling at high lineal speed, either of which quantity or time interval may be varied as required to inject the lubricant on to the piston in definite times relation with the travel of the piston so that the predetermined quantity of lubricant is delivered on to the piston, and the quantity is such as to form and hold the seal required between the piston and cylinder wall.

Another object of this invention is to provide a device which includes a firing chamber adapted to receive a quantity of liquid, means for firing or forcing the quantity of liquid from said firing chamber under positive pressure during a definite relatively extremely short period of time, determined by the movement of another object to deliver a definite quantity of said liquid to a position positively defined by that other moving element.

Another object of this invention is to provide a device for use in lubricating the pistons of engines in which the pistons travel with high lineal speed which includes, means adapted to positively force a predetermined quantity of lubricant on to the piston at each predetermined interval of time and which also is of such construction as to permit its operation to admit lubricant to the cylinder of the engine at any other intervals desired under manual operation or to permit a flooding of the engine with lubricant to prevent seizure of the engine when momentarily the engine is subject to a load in excess of that for which its operation has been determined.

Another object of this invention is to provide a device including means for separating a small quantity of lubricant, for example, a drop, and positively forcing the same to a point of application or use.

Other objects and advantages of this invention it is believed will be apparent from the following detailed description of a preferred embodiment thereof as illustrated in the accompanying drawing.

Figure 1:
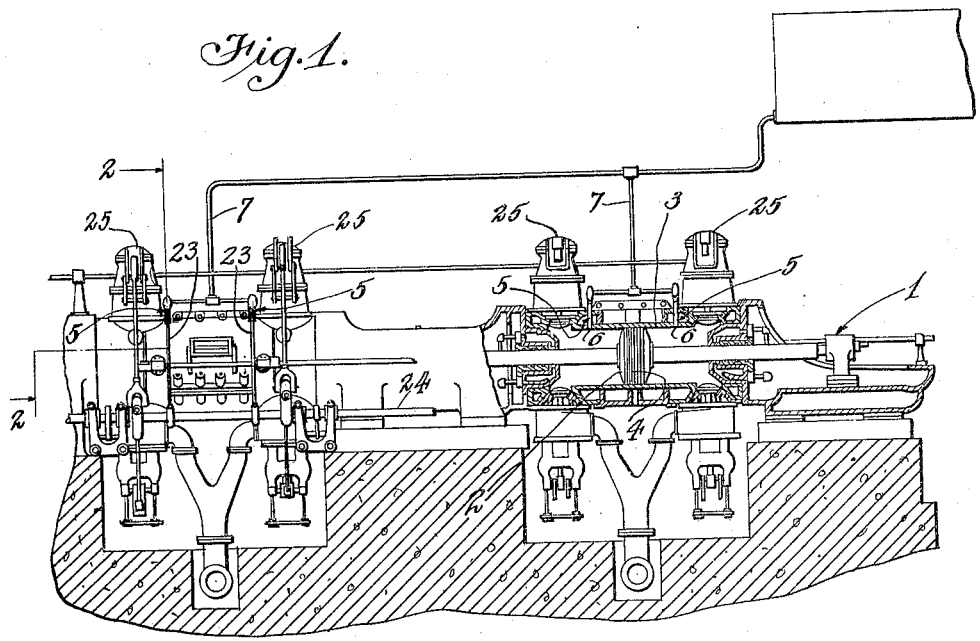
Figure 1 is an elevation of an engine illustrating fluid injecting devices embodying this invention as adapted thereto.
Figure 2:
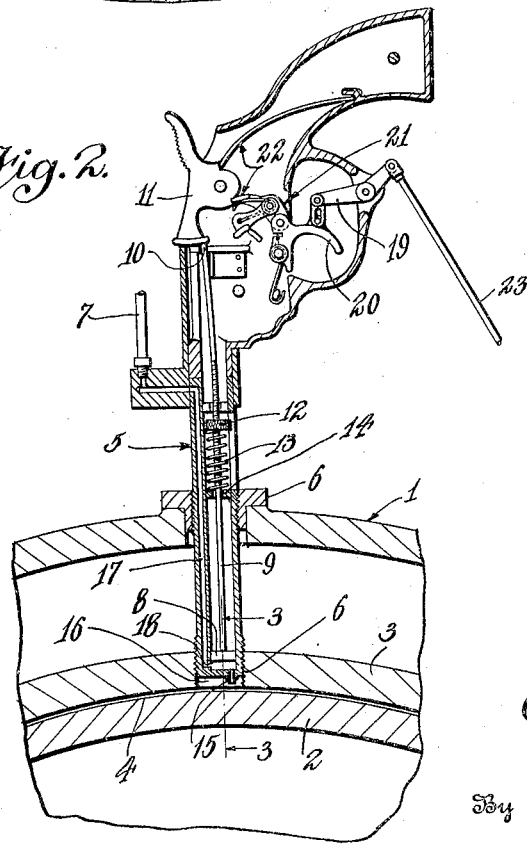
Figure 2 is a sectional end elevation taken substantially on the line 2—2 of Figure 1, and partially broken away to permit enlargement of the fluid injecting device and the piston and cylinder of the engine.
Figure 3:
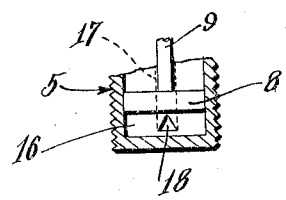
Figure 3 is an enlarged fragmental sectional view taken substantially on the line 3—3 of Figure 2.

In the preferred embodiment of this invention illustrated in the accompanying drawing, 1 indicates an engine, pump, or like mechanism, including a piston 2 which reciprocates within the liner 3 of a cylinder. The piston 2 is customarily provided with a multiplicity of sealing rings 4 for sealing the piston within the liner 3.

It has been found that proper lubrication of such a moving piston necessitates the formation of a protective film of lubricant between the liner 3 and the piston 2, and that just sufficient lubricant to maintain this seal or film is required for the efficient operation of such an engine or pump. Too little lubricant results in the formation of an inadequate film between the piston 2 and liner 3, while too great lubrication, or over-lubrication, results in the formation of excess carbon and consequent troubles.

In order to maintain proper lubrication of such a piston 2, it has been found that the lubricant must be ejected directly against the piston 2, preferably between the piston rings 4 thereof in a definite quantity at definite predetermined intervals, depending upon the speed of operation or reciprocation of such a piston, the material being pumped in the proportionate sizes of the piston to the liner 3 and the length of the stroke of the piston 2. Different load conditions have also been found to require different applications of lubricant to the piston in order to maintain proper lubrication and prevent seizing of the piston within the liner 3.

In its preferred form, the lubricant injecting device embodying this invention includes a cylindrical barrel 5 which is inserted through the engine 1 and into the liner 3 as illustrated at 6.

The cylindrical barrel 5 is connected with a source of lubricant through the conduit 7 which extends either to a common source of lubricant for all of the fuel injecting devices for a single engine 1, or a battery of such engines 1, or may be connected with a separate lubricant reservoir which feeds the cylindrical barrel 5 by gravity. Any suitable or desirable form of feed may be provided for maintaining lubricant at all times within the cylindrical barrel 5.

Mounted within the cylindrical barrel 5 is a plunger 8 which is secured to a plunger rod 9 which extends through the cylindrical barrel 5. Secured to the end of the plunger 8 is a firing head 10 which is adapted to be engaged by a hammer 11. The plunger rod 9 is provided with an adjustable stop 12 which is screw-threaded to the plunger rod 9 and engages a return spring 13. The return spring 13 engages a transverse partition 14 formed at the end of the cylindrical portion of the barrel 5. The stop 12 is screw-threaded to the plunger rod 9. At the forward end of the barrel 5 there is provided an ejector device, or orifice means, 15 through which the lubricant from the chamber 16 in front of the plunger 8 is forced by the impact force imparted to move the plunger 8. A longitudinally extending port 17 is formed in the wall of the cylinder 5 which communicates at one end with the lubricant within the barrel 5, and at its opposite end communicates with a vertically extending port 18, which is alternately closed and opened by the reciprocation of the plunger 8 to alternately admit a predetermined quantity of fuel into the chamber 16 in advance of the plunger 8.

The delivery end of the port 18 is provided with a V-shaped delivery orifice for the purpose of providing a quick shut-off of the lubricant being admitted to the chamber 16 as the plunger 8 is driven forwardly in the chamber 16 by the impact of the hammer 11 against the head 10 of the plunger rod 9.

The orifice means 15 extends into the liner 3 of the engine 1 in position to deliver the lubricant directly on to the piston 2, preferably between the second and third piston rings of the piston 2. The actuation of the hammer 11 is controlled by any suitable form of timing means so that this delivery will be effected.

For the purpose of timing the actuation of the hammer 11, any suitable means may be provided, one form of which is diagrammatically illustrated as including an actuating lever 19, which engages the trigger 20 which is connected through mechanism 21 with hammer drawing and releasing means 22. The hammer drawing and releasing means 22 is not specifically herein described, as this may be of any suitable form, as is common in the art of forming firing arms or the like, and this means in itself forms no part of this invention. The lever 19 is connected by means of a rod 23 with the cam shaft 24, so that the hammer 11 is struck in timed relation with the opening of the valves 25 of the engine 1.

The barrel 5 is positioned in the engine 1 in position so that as the hammer 11 is actuated by the actuation of, and in timed relation with, the valves of the engine 1, the lubricant ejected through the orifice means 15 will impact the piston 2 directly between the rings of the piston.

Any suitable form of time-actuating means for actuating the hammer 11 may be provided such, for example, as electrical solenoid connected in timed relation with the cam shaft of the engine to contact spaced contacts at given intervals, or any other suitable form of means which is believed could be provided for actuating such a hammer 11 in definite timed relation by any mechanic skilled in the art.

The adjustable stop 12 provided on the plunger rod 9 provides a means for varying the stroke of the plunger 8, and consequently the quantity of lubricant that will be ejected from the chamber 16 on each stroke of the hammer 11.

The hammer 11 is preferably connected with means which permit its manual operation such, for example, as the trigger 20 to permit the injection into the cylinder of the engine 1 of lubricant from the barrel 5 at intervals or to inject the lubricant directly against the piston 2 to permit flooding of the engine with lubricant under over-load conditions of the engine 1 to prevent seizing of the piston within the liner 3.

The chamber 16 is formed to receive a definite quantity of lubricant, and the plunger 8 reciprocates in this chamber to eject a relatively small quantity of lubricant from this chamber 16, for example, a drop, and to positively force this small quantity of lubricant to a point of application or use as against the piston 2, when operating under timed conditions, or to force this small quantity of lubricant into a definite position which may be determined by the operator of the engine, and manually actuating the trigger 20.

Having fully described a preferred form of my invention, it is to be understood that I do not wish to be limited to the details herein set forth, but my invention is of the full scope of the appended claim.

I claim:

A lubricator device for an engine including a cylinder, a piston operatively mounted therein, a lubricator barrel in communication with said cylinder and having an oil feed means, a plunger operatively mounted in said barrel, a spring for yieldingly retaining said plunger in retracted position, a hammer adapted to strike said plunger to force the oil contained in said barrel into said cylinder, a trigger mechanism adapted to be manually actuated to operate said hammer, and means associated with said trigger for actuating said trigger and thereby said hammer in timed relation with the travel of the piston in the cylinder.

Signed at Los Angeles, Calif., this 26 day of June 1928.

CEYLON C. CORKRAN.